United States Patent
De La Rosa et al.

(10) Patent No.: US 11,203,491 B1
(45) Date of Patent: Dec. 21, 2021

(54) ACTIVE SAFETY SYSTEMS FOR ITEM SORTATION EQUIPMENT

(71) Applicant: Amazon Technologies, Inc., Seattle, WA (US)

(72) Inventors: Jose Luis De La Rosa, Seattle, WA (US); Larry Joe Robb, Miramar Beach, FL (US); Justin Stone, Frisco, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/039,338

(22) Filed: Sep. 30, 2020

(51) Int. Cl.
  *B65G 43/08* (2006.01)
  *B07C 3/00* (2006.01)
  *G06F 7/00* (2006.01)
  *B65G 1/137* (2006.01)
  *B65G 1/04* (2006.01)

(52) U.S. Cl.
  CPC .......... *B65G 43/08* (2013.01); *B65G 1/0492* (2013.01); *B65G 1/1376* (2013.01); *B65G 2203/0291* (2013.01); *B65G 2203/041* (2013.01); *B65G 2207/40* (2013.01); *B65G 2811/0678* (2013.01)

(58) Field of Classification Search
  CPC .............. B65G 43/08; B07C 3/00; G06F 7/00
  USPC ........ 198/349, 358, 502.3; 29/548; 700/214, 700/230
  See application file for complete search history.

(56) References Cited

U.S. PATENT DOCUMENTS

| | | | | |
|---|---|---|---|---|
| 6,975,747 | B2* | 12/2005 | Tran | G06T 7/0002 198/340 |
| 8,608,068 | B2* | 12/2013 | Carpenter | G07B 17/00661 235/385 |
| 9,809,384 | B2* | 11/2017 | Mountz | B65G 1/1378 |
| 10,062,047 | B2* | 8/2018 | Kadaba | G06Q 10/083 |
| 10,226,794 | B2* | 3/2019 | Vegh | B07C 3/02 |
| 10,422,870 | B2* | 9/2019 | Mindell | G01S 13/76 |
| 10,438,034 | B2* | 10/2019 | Wagner | B65G 25/04 |
| 10,538,394 | B2* | 1/2020 | Wagner | B65G 47/256 |
| 10,583,986 | B2* | 3/2020 | Wagner | B65G 47/962 |
| 10,625,305 | B2* | 4/2020 | Wagner | B07C 3/008 |

(Continued)

OTHER PUBLICATIONS

US 2020/0130951 A1, Wagner et al., Apr. 30, 2020.*
US 2020/0151410 A1, Wagner et al. May 14, 2020.*

*Primary Examiner* — Douglas A Hess
(74) *Attorney, Agent, or Firm* — Eversheds Sutherland (US) LLP

(57) ABSTRACT

Systems, methods, and computer-readable media are disclosed for active safety systems for item sortation equipment. In one embodiment, an example system for an item sortation machine may include a first camera configured to image a first exterior portion of the item sortation machine, memory configured to store computer-executable instructions, and at least one processor configured to access the memory and execute the computer-executable instructions to detect a human present at a first location in the first exterior portion, and determine, using the first location, a first portion of an aisle of the item sortation machine to designate a restricted travel zone. Shuttles of the item sortation machine in the restricted travel zone may be prevented from movement. The system may determine that a first shuttle of the item sortation machine is in the restricted travel zone, and may cause the first shuttle to be paused.

20 Claims, 11 Drawing Sheets

(56) References Cited

U.S. PATENT DOCUMENTS 10,906,188 B1 *  2/2021  Sun ............................ B07C 5/36
10,941,000 B2 *  3/2021  Wagner ................ B65G 47/905

* cited by examiner

ACTIVE SAFETY SYSTEMS FOR ITEM SORTATION EQUIPMENT

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. Accordingly, improvements in various operations of order fulfillment, such as improvements to picking technology, sorting technology, packing technology, and so forth may be desired, such that manual efforts can be redirected to different tasks.

Figure 1:
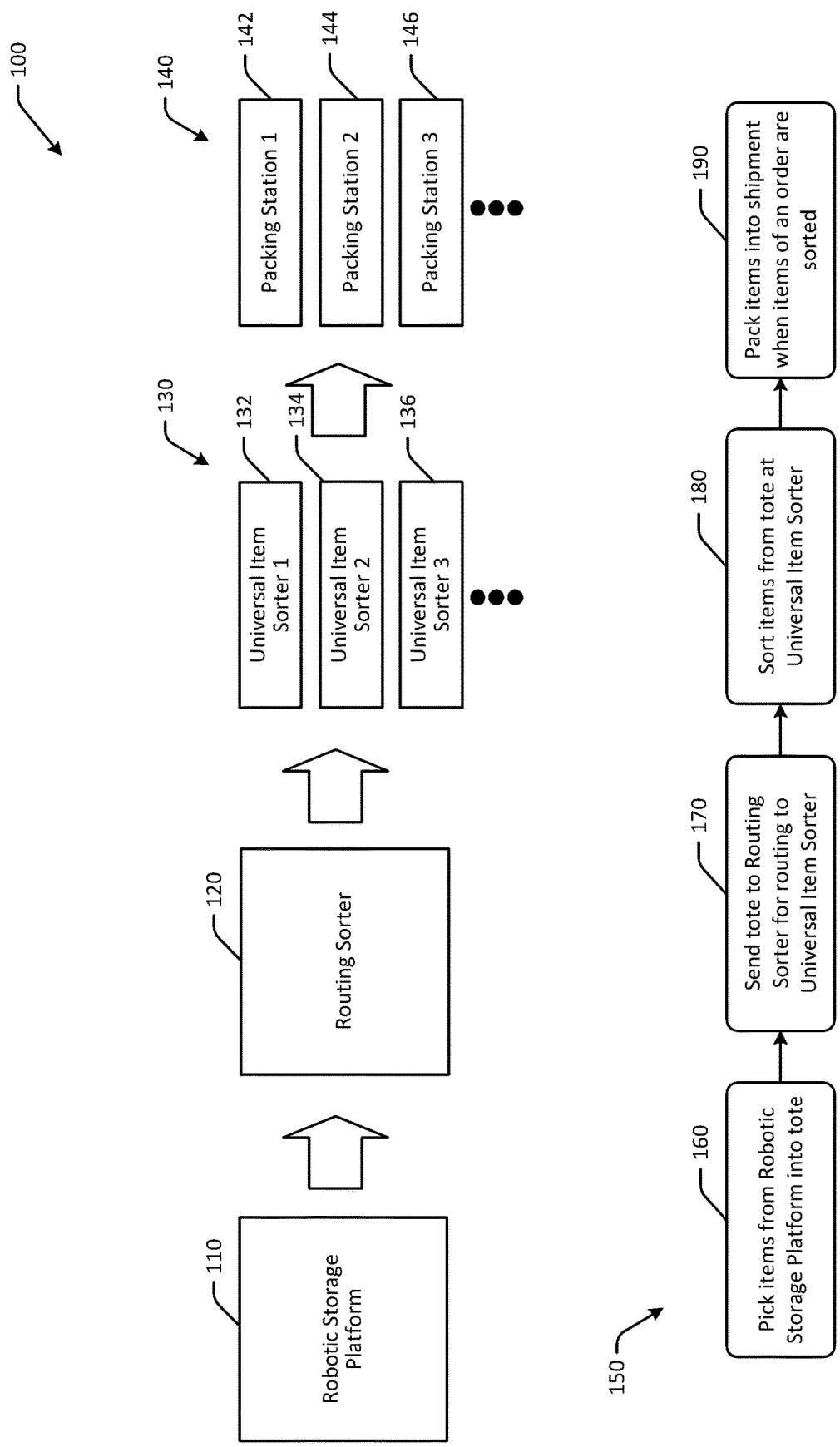
FIG. 1 is a hybrid schematic illustration of an example use case for active safety systems for item sortation equipment and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. After products are picked, the products may be placed in a container, such as a tote or other container, and directed to sortation machines to direct the picked products to the appropriate packing station. For example, products in the same order may be directed to the same packing station for consolidation and subsequent packing.

Accordingly, some machines and/or systems may handle a relatively high volume of items, such as products or other objects, during operation. In one example, an item sortation system, such as a system configured to sort items for particular orders, or to sort packages intended for certain destinations or regions, may handle upwards of one million items per day. Some items, such as lightweight or flat items, may be difficult to handle using machines or robots due to issues such as the item falling off of a machine during transport, the item slipping through gaps in a machine, and so forth. In one example, gift cards may be difficult to handle in item sortation machines because the gift cards may fly off of shuttles used to transport the gift card within the item sortation system. As a result, the gift cards or other lightweight items may fall to a floor of the item sortation system or other machine, and may have to be manually retrieved and sorted, thereby causing delays in processing. In addition, such incidents may create other issues, such as incorrect or inaccurate inventory statuses (e.g., an item may be marked as delivered to a container, when in fact it fell on the floor, or an item may be marked not delivered, when in fact it was delivered, etc.).

In some cases, clearing of jams and/or retrieval of fallen items may be performed manually. For example, an operator may reach into a sortation machine using a tool to clear a jam. However, to safely do so, operation of the machine is paused. In some instances, operators may attempt to clear jams or retrieve items without pausing the machine, thereby creating a potential safety hazard. To avoid creating safety concerns, current machines include spacer components and other barriers that physically prevent operators from reaching into the machine with a tool and coming into contact with moving parts. As a result, even if the machine is in operation, the operator will not be injured due to the physical barriers and spacing components. However, this approach results in machines with larger physical footprints and thereby increases the space requirements for the machines or other equipment in a fulfillment center. Moreover, the risk of jams is increased due to longer chutes, additional barriers, and so forth.

Embodiments of the disclosure provide the same safety features, as well as additional safety enhancements, of current machines, but do not require the physical barriers and spacing components, and do not require operation of the entire machine to be paused. Accordingly, embodiments of the disclosure provide machines and other equipment with smaller footprints, thereby saving valuable space in the fulfillment center, as well as increased throughput due to avoidance of the need to pause operation of the entire machine. For example, embodiments of the disclosure include active safety systems for item sortation equipment that use cameras and/or computer vision to detect users in the presence of a machine, and to automatically pause shuttle movement in a region of the machine where the user may reach into with a tool. Regions of the machine beyond the reach of the user(s) in the vicinity of the machine may remain in motion at reduced speed and/or at normal speed. As a result, the user is safe and cannot be injured by the machine, while other portions of the machine beyond the reach of the user remain in normal or reduced speed operation.

Embodiments of the disclosure include active safety systems for item sortation equipment that may be configured to track user presence in the vicinity of item sortation equipment, and to determine portions of the item sortation equipment to modify operation of and/or other functions to improve functionality and efficiency of item sortation systems. Some embodiments may be standalone systems, while other embodiments may be integrated into item sortation systems. Certain embodiments may be configured to utilize machine learning algorithms to improve camera-based detection of users and their movements.

Item sortation systems may include one or more shuttles used to transport items from an induction portion of the item sortation system to a particular chute or bin that is associated with a particular online order or geographic destination. Other embodiments may include chutes may be associated with different criteria. In some embodiments, item sortation equipment may be used to sort or otherwise process items up to 20 pounds. The shuttles may include onboard conveyors and may travel vertically and/or horizontally inside the item sortation system to transport items to particular chutes. In some instances, the shuttles may weight about 35 pounds and may move at speeds of up to 75 inches per second. During normal operation, items may fall off the shuttles while in transit to a destination, and may accumulate on the floor of an aisle of the item sortation system. In addition, items that fall off of the shuttles may not be detected, and may be incorrectly marked as delivered to a container, thereby creating inventory issues due to incorrect item delivery status (e.g., an item for an order may be marked delivered, but may not have actually been delivered, etc.). As a result, order fulfillment may be delayed and/or inventory shortages may be created due to replacement items being retrieved while an item is on the floor. Items on the floor may potentially obstruct the travel path of the shuttles, and may therefore cause jams or collisions resulting in unplanned downtime, damaged items, and/or damage to the shuttles or the item sortation system.

Certain embodiments include one or more overhead cameras positioned to image either side of an item sortation system. Data from the cameras may be used to detect the presence of a user and to track user movement. Based at least in part on the position of the user with respect to the system, shuttles in a portion of an aisle corresponding to the user location may be paused in place while the user is present. As a result, the user will not be injured by the shuttles and/or any items that are to be delivered to a container near the user. Shuttles out of reach of the user may operate at reduced speeds, while other shuttles well beyond the reach of the user may operate at normal speeds. Routing of the shuttles through the item sortation machine may also be modified based at least in part on user location (e.g., shuttles may be rerouted to avoid restricted travel zones, etc.). To control operation of the shuttles, in some embodiments, a computer system associated with the item sortation system may process the data from the camera(s) related to user positioning. In other embodiments, the computer system associated with the item sortation system may receive commands and/or other instruction data from an external controller and computer system related to operation of the shuttles.

Embodiments of the disclosure include active safety systems for item sortation equipment that may improve processing and fulfillment of various sortation tasks at a fulfillment center, such as sortation of multi-item orders, or orders that include more than one item. Some embodiments may be configured to prevent shuttles from moving in specific columns or rows of the item sortation machine to eliminate risk of interference with a user, and may pause operation of shuttles that are within reach of a user with a tool until the user leaves the vicinity of the machine or moves elsewhere. Certain embodiments may dynamically reallocate or transfer container locations to areas where shuttle traffic is allowed. Certain embodiments include item sortation systems with modular sorting machines that can be combined to form larger sorting machines, and that include receiving bins or containers coupled to one or more sides (e.g., opposite sides, etc.) of the sorting machine to increase throughput and speed of consolidating items for multi-item orders. Some embodiments include optimized process flows for processing of orders at fulfillment centers, as well as process flows or methods to increase speed of consolidating products in a multi-item order. As a result, throughput of fulfillment centers may be improved, and/or logistics of fulfillment center operations may be less complicated.

Referring to FIG. 1, an example use case 100 for active safety systems for item sortation equipment and an example process flow in accordance with one or more embodiments of the disclosure. Although discussed in the context of online orders, other embodiments may be directed to any suitable use case where items are picked and sorted, such as instances where users may pick up orders rather than receiving a shipment, instances where packages are sorted based on geographic regions, and so forth.

In FIG. 1, a fulfillment center may include a robotic storage platform 110, a routing sorter 120, one or more item sortation systems or universal item sorters 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual labor or a combination thereof may be used to pick products. The picking process at the robotic storage platform may include locating a product in an order, obtaining the product, and sending the product to the robotic storage platform 110, such as via a conveyor belt. In the illustrated embodiment, products at the robotic storage platform 110 may be placed in a container, such as a tote. In some embodiments, the tote may be assigned to, or otherwise associated with, a particular universal item sorter machine. For example, a certain tote may be associated with a certain universal item sorter, such that products that are designated to be picked and placed in the tote are for orders that are to be consolidated at that particular universal item sorter.

At the routing sorter 120, totes including products that have been picked may be routed to the appropriate or designated universal item sorter. For example, the routing sorter 120 may determine an identifier associated with the tote, and may determine the universal item sorter associated with the tote using the identifier. The routing sorter 120 may route or direct the tote to the appropriate universal item sorter. In other embodiments, the tote may be directed to a random universal item sorter or a selected universal item sorter based on capacity.

The universal item sorters 130 may include one or more item sortation machines. In FIG. 1, a first universal item sorter 132, a second universal item sorter 134, a third universal item sorter 136, and so forth may be included. Any number of universal item sorters may be included. Some or all of the universal item sorters may be optionally associated with certain totes. The universal item sorters may be used to consolidate or otherwise aggregate products for multi-item orders. For example, a first tote may include a first item of a multi-item order, and a second tote may include a second item of the multi-item order. The universal item sorter may therefore identify the orders associated with the respective products in a tote, and may transport the products to a container, such as a bin, associated with the order. When the order is complete with all of the products in the associated bin, the order may be packed. Accordingly, a specific universal item sorter may be designated for fulfillment of a particular multi-item order. As a result, all of the products in the multi-item order may be placed in totes that are associated with, or otherwise directed to, that particular universal item sorter. At the universal item sorters 130, totes that are received via the routing sorter 120 may be emptied, and the products in the respective totes may be transported to the appropriate bins for the orders for which the products were picked. Example universal item sorters or item sortation systems are discussed with respect to at least FIGS. 3-4.

After a multi-item order is complete (e.g., the universal item sorter has delivered all of the products in the order to the appropriate bin, etc.), the order may be packed at the packing station 140. In some embodiments, one or more packing stations may be included. In some instances, a packing station may service more than one universal item sorter, while in other instances, more than one packing station may service one universal item sorter. In the illustration of FIG. 1, a first packing station 142 may be used to pack orders from the first universal item sorter 132, a second packing station 144 may be used to pack orders from the second universal item sorter 134, a third packing station 146 may be used to pack orders from the third universal item sorter 136, and so forth. At the packing stations 140, the orders may be placed into boxes and sealed for subsequent shipment. The packages may then be processed for shipment to the user.

At the fulfillment center, an example process flow 150 illustrated in FIG. 1 may be implemented to improve the efficiency and/or throughput of the fulfillment center. At a first block 160, items may be picked from the robotic storage platform 110 into a tote. The tote may be associated with a specific universal item sorter in some embodiments. At a second block 170, the tote may be sent to the routing sorter 120 for routing to a universal item sorter. At a third block 180, the items from the tote may be sorted for an order with multiple item by the universal item sorter. At a fourth block 190, the items may be packed into a shipment when all of the items in the order are sorted.

Figure 2:
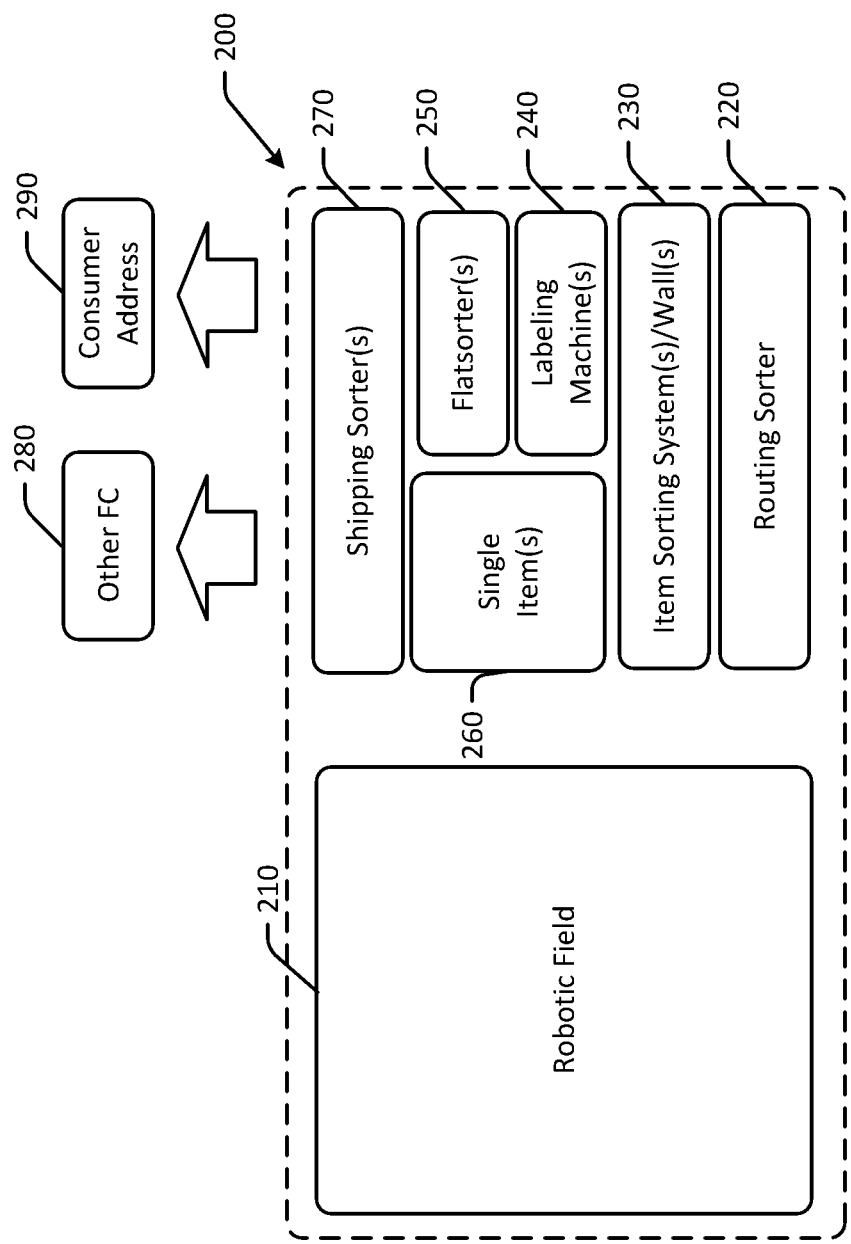
FIG. 2 is a hybrid schematic illustration of an example use case for active safety systems for item sortation equipment in accordance with one or more embodiments of the disclosure.

FIG. 2 is a hybrid schematic illustration of an example use case for active safety systems for item sortation equipment in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to direct totes or other containers to item sorting systems, one or more item sorting systems or walls 230 used to consolidate products for multi-item orders and/or to pack multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200.

In some embodiments, the item sorting systems described herein may be a part of the flat sorters 250, where the item sorting systems may be configured to sort packages into containers or chutes. In such embodiments, the item sorting systems may or may not also be used at the item sorting systems 230 portion of the fulfillment center 200. Accordingly, the item sorting systems may be disposed at, or otherwise coupled to, a cross belt conveyor system, such as the flat sorters 250 of the fulfillment center 200.

The item sorting machines 230 may include containers and/or containers of different sizes (e.g., small, medium, large, etc.) and may be configured, in one example, to handle items that weigh up to twenty or more pounds (e.g., 100 pounds or more, etc.). In some embodiments, the item sorting machines 230 may include multiple chutes, such as about 328 chutes, and may be configured to sort items at a rate of about 2,100 units per hour or more. In some instances, the item sorting machines 230 may have two inductors (e.g., one on each side, etc.), and may be modular. For example, the item sorting machines 230 may each include sixteen expansion modules, where expansion modules may be defined as three two-sided columns next to one another for a total length of about 80 feet. The item sorting machines 230 may reduce labor and capital costs associated with processing orders.

In some embodiments, the item sorting system 230 may replace other processes, such as manual processes. For example, manual induction of products from a tote to a sorter machine may be a bottleneck that is avoided by the systems and methods described herein. The item sorting system 230 may be a cross-belt shuttle sorter that sorts singulated products into containers or totes. Item sorting systems 230 may be capable of sorting at a rate of 2,100 units per hour or more. Certain item sorting systems 230 may be configured to handle items of up to twenty pounds, or more in some instances, with dimensions of about 18"× 14"×8" or greater, which may cover almost all products at the fulfillment center 200. The item sorting systems 230 may operate as a high-speed, high-destination sort solution that intakes items or packages and sorts them into containers using a shuttle that travels vertically and horizontally inside the machine (or outside in some instances).

Individual item sorting machines may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of chutes or containers (e.g. induct individual items from a container that has multiple items, and place the inducted items into the appropriate chute to be routed to a container, where chutes or containers are associated with multi-item orders). The tote from which items are inducted may be associated with the individual item sorting system machine (e.g., the modular sorting machines that form the individual item sorting system machine, etc.). In some embodiments, item sorting systems or individual item sorting machines may be configured to induct and sort packages based at least in part on a destination of the respective packages. Destinations may be internal destinations within a fulfillment center, external destinations to geographic regions or addresses, or other destination types. For example, output from the fulfillment center 200 may include containers of items routed to other fulfillment centers 280, packages addressed to consumer addresses 290, and so forth.

Accordingly, in some embodiments, item sorting systems may be arranged in rows and may receive assigned totes from a routing sorter, thereby streamlining fulfillment center operation and reducing labor and space costs. The item sorting systems may process totes for multi-order sortation and consolidation. As a result, there may no longer be a need to singulate and send items to a wall for manual extraction, because each tote may be assigned to a particular item sorting system machine. Induct stations can be replaced with item sorting machines.

In another embodiment, pickers may pick items directly to a segmented belt conveyor at a station that may be near an item sorting system machine. Other nearby pick stations may also pick items directly to conveyance for the same item sorting system machine. Picked items being transported to a single item sorting system machine may merge together to be inducted into their unique item sorting system machine, where multi-item orders may be consolidated and sent to packing.

Embodiments of the disclosure include active safety systems that may be used with any of the sortation equipment of the fulfillment center 200 at the various locations at which items and/or packages are sorted. Certain embodiments may improve processing speed and/or throughput of fulfillment centers. Certain embodiments may improve performance of mechanical equipment for sortation and/or consolidation of items for multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
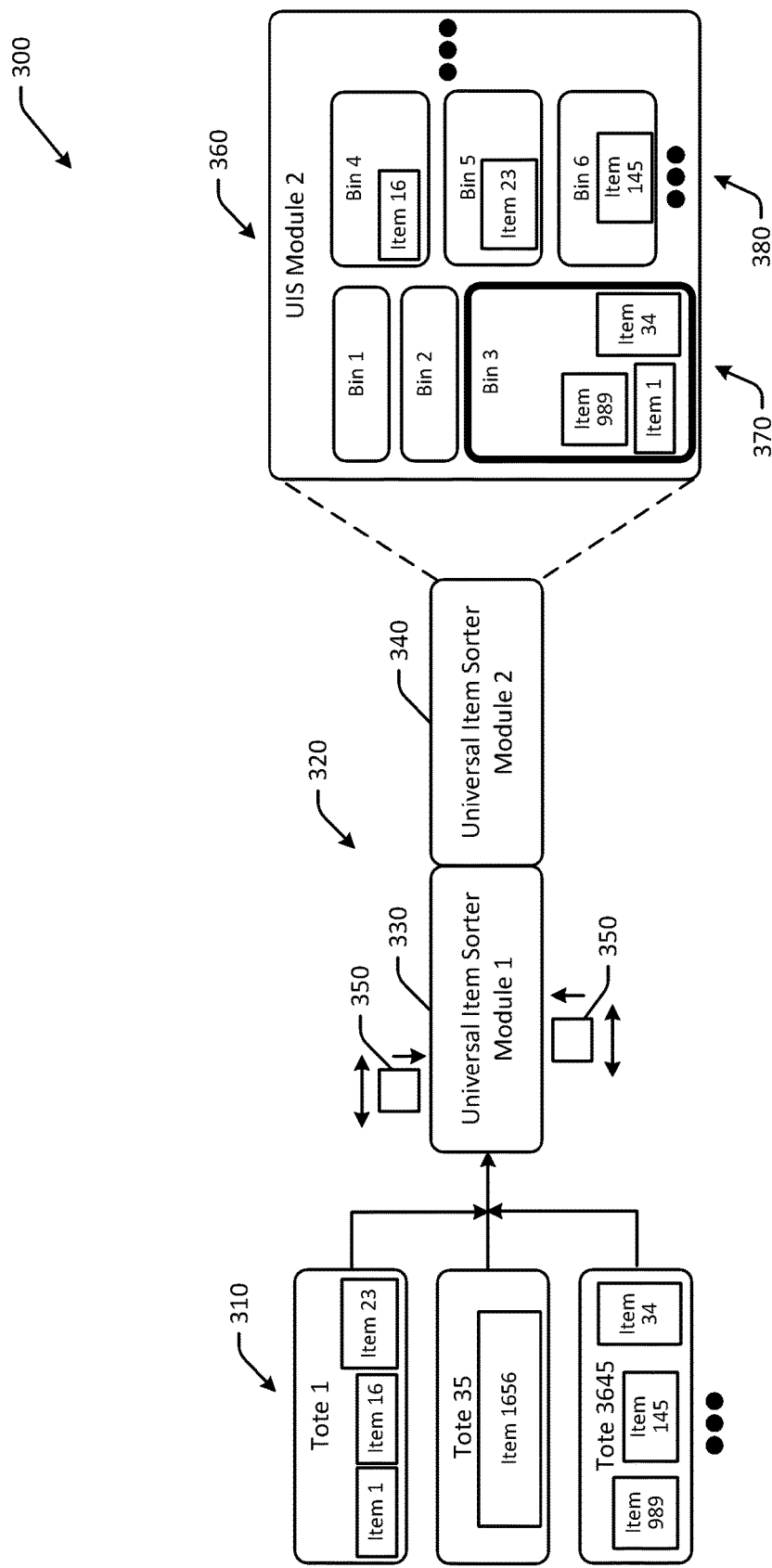
FIG. 3 is a schematic illustration of an item sortation system and additional components in accordance with one or more embodiments of the disclosure.

FIG. 3 is a schematic illustration of an item sortation system and additional components in accordance with one or more embodiments of the disclosure. Other embodiments may include additional or fewer components. The illustration of FIG. 3 is not to scale, and may not be illustrated to scale with respect to other figures. The universal item sorter illustrated in FIG. 3 may be the same universal item sorter discussed with respect to FIGS. 1-2.

In FIG. 3, an example use case 300 including a set of totes 310 and an item sortation system, or a universal item sorter machine 320, is depicted. The set of totes 310 may include one or more totes that may be assigned to, or otherwise associated with, the universal item sorter machine 320. For example, Tote 1, Tote 35, Tote 3645, and so forth may be associated with the universal item sorter machine 320. The totes may have identifiers, such as alphanumeric or other identifiers. The totes may be used to place items that have been picked into the totes. The items that are placed in the totes may be associated with orders that are to be consolidated by the universal item sorter machine 320. For example, Tote 1 may include item 1, item 16, and item 23, Tote 35 may include item 1656, Tote 3645 may include item 989, item 145, and item 34, and so forth. The item sortation system, or the universal item sorter machine 320, may be configured to receive items from a tote that includes one or more, such as multiple items, and the tote may be assigned to the item sortation system or the universal item sorter machine 320.

The totes 310 may be directed to the universal item sorter machine 320 for sorting and consolidation. For example, items in the totes 310 may be inducted into the universal item sorter machine 320 via a conveyor belt.

The universal item sorter machine 320 may include one or more modules, and may be adjusted in size by adding or removing modules as needed. For example, the universal item sorter machine 320 may include a first modular item sorting machine 330 and a second modular item sorting machine 340. The second modular item sorting machine 340 may be coupled to the first modular item sorting machine 330.

The first modular item sorting machine 330 may include a first support disposed on a first side of the first modular item sorting machine 330, and a second support disposed on the first side of the first modular item sorting machine 330. The first support and the second support may form a first chute between the first support and the second support. The chute(s) may be accessible via an aisle disposed at or near a center of the item sortation machine. In some embodiments, chutes may be disposed at both sides of the aisle. Some item sortation machines may include more than one aisle. The first modular item sorting machine 330 may include a first bin positioned at a first vertical location in the first chute, and a second bin positioned at a second vertical location in the first chute. The first bin and the second bin may have the same height or different heights. In some embodiments, chutes may be disposed about more than one side of the first modular item sorting machine 330.

The second modular item sorting machine 340 may include a third support disposed on the first side of the second modular item sorting machine 340, and a fourth support disposed on the first side of the second modular item sorting machine 340. The third support and the fourth support may form a second chute. The second modular item sorting machine 340 may include a third bin positioned at a first vertical location in the second chute, and a fourth bin positioned at a second vertical location in the second chute. The third bin and the fourth bin may have the same height or different heights, and may have different heights than the first bin and/or the second bin. The first bin, the second bin, the third bin, and/or the fourth bin can be rearranged in different vertical locations and chutes, and may be configured to receive items of orders comprising multiple items. In some embodiments, chutes may be disposed about more than one side of the second modular item sorting machine 340.

The respective modules of the universal item sorter machine 320 may include one or more bins, or containers that hold items of a multi-item order. For example, as illustrated in side view 360, the second modular item sorting machine 340 may include a first chute 370, or vertical stacking, of bins, and a second chute 380 of bins. The bins in the respective chutes may be of different sizes or dimensions, or may be placed in different vertical locations along the chute. The universal item sorter machine 320 may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles 350, which may move in one or more directions within an aisle of the universal item sorter machine 320. The shuttles 350 may include onboard conveyors that may be used to load and unload items from the shuttles 350. In an example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

Figure 4:
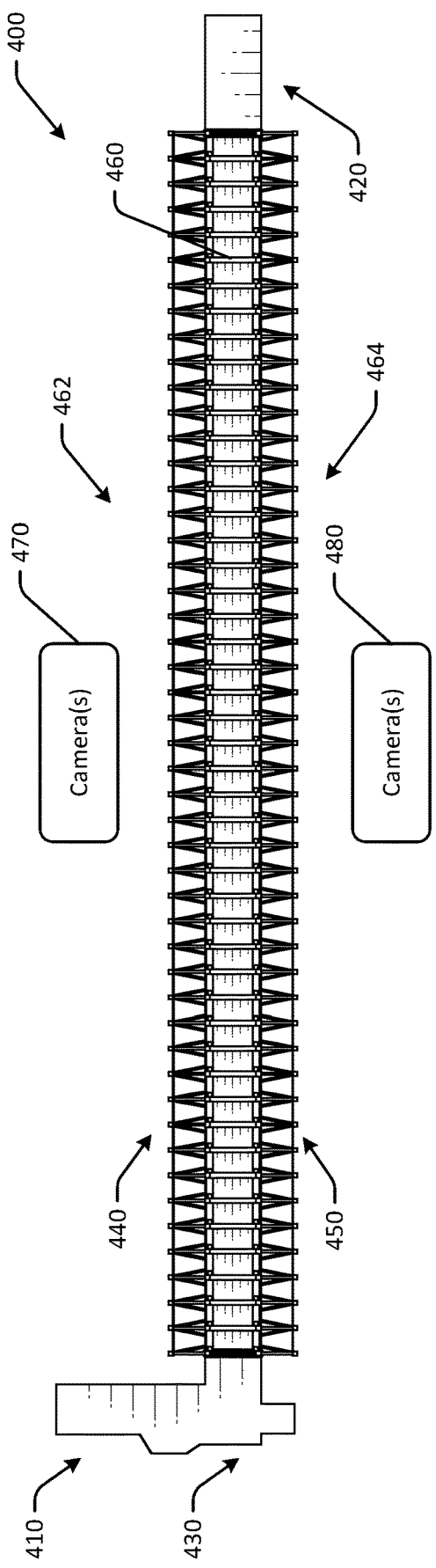
FIG. 4 is a schematic illustration of a top view of an item sortation system with an active safety system in accordance with one or more embodiments of the disclosure.

FIG. 4 is a schematic illustration of a top view of an item sortation system 400 with an active safety system in accordance with one or more embodiments of the disclosure. Other embodiments may include additional or fewer components. The illustration of FIG. 4 may not be to scale, and may not be illustrated to scale with respect to other figures. The item sortation system illustrated in FIG. 4 may be the same universal item sorter discussed with respect to FIGS. 1-3.

The item sortation system 400 may include an induction portion 410 at which items for sortation may be inducted into the item sortation system 400. The item sortation system 400 may include a first set of chutes 440 on a first side 462 of the item sortation system 400, and a second set of chutes 450 on a second side 464 of the item sortation system 400. An aisle 460 may be disposed between the first set of chutes 440 and the second set of chutes 450. The aisle 460 may run at least partially between the induction portion 410 and a distal end 420 of the item sortation system 400. Shuttles may move vertically along a column 430 at or near the induction portion of the item sortation system. The chutes may be vertical columns formed along the respective sides. One or more of the chutes may lead to one or more bins positioned at various vertical positions along the chute. The bins may be removable from the chute in some instances, and may not be removable in other instances. The bins may be of different sizes to accommodate different numbers of items and/or items of different sizes.

The item sortation system 400 may include one or more shuttles that transport items from the induction portion 410 to a chute of the first set of chutes 440 and/or the second set of chutes 450 via traversal of the aisle 460. Shuttles may include individual conveyor belts to load and unload items.

The item sortation system 400, or a corresponding active safety system, may include one or more cameras used to detect human presence in the vicinity of the item sortation system 400. For example, the item sortation system 400 may include a first camera 470 configured to image or view a first surrounding portion of the item sortation system 400 on the first side 462, and a second camera 480 configured to image or view a second surrounding portion of the item sortation system 400 on the second side 464. The respective cameras 470, 480 may be overhead cameras. In one embodiment, the first camera 470 may be a first overhead camera configured to image a first exterior surrounding area of the item sortation system 400, the first exterior surrounding area adjacent to the first set of chutes 440, and the second camera 480 may be a second overhead camera configured to image a second exterior surrounding area of the item sortation system 440, the second exterior surrounding area adjacent to the second set of chutes 450. The cameras 470 may be wireless cameras and may be configured to send image and/or video data to a computer system or controller. In one example, the cameras may be configured to facilitate and/or implement machine learning, and may include one or more untrained or pre-trained model. Some cameras may be configured to implement deep learning or other machine learning techniques that use neural networks to learn and make predictions through computer vision. Data from the cameras may be used to detect human presence, track human location, determine shuttle movements, send shuttle speed and/or conveyor adjustment notifications, and so forth.

Accordingly, the item sortation system 400 may include the induction portion 410 at which first items for sortation are inducted into the item sortation system 400, and may include the aisle 460 that is disposed about a center of the item sortation system 400 or otherwise between two sets of chutes. The item sortation system 400 may include a first plurality of chutes disposed along a first side of the aisle 460, and a second plurality of chutes disposed along a second side of the aisle 460. The item sortation system 400 may include one or more shuttles that include conveyor belts, where the shuttles are configured to transport the first items from the induction portion 410 to a chute of the first plurality of chutes or the second plurality of chutes. The item sortation system 400 may include the overhead cameras that may provide data used to detect human presence. Based on the detection of human presence, a portion of the aisle adjacent to one or more chutes may be designated a restricted travel zone where shuttles are not allowed to enter and shuttles already in the zone are paused, a portion of the aisle adjacent to one or more chutes may be designated a reduced speed zone where shuttles may travel at a reduced speed, and a portion of the aisle adjacent to one or more chutes may be designated an unrestricted travel zone and operation may continue uninterrupted.

Figure 5A:
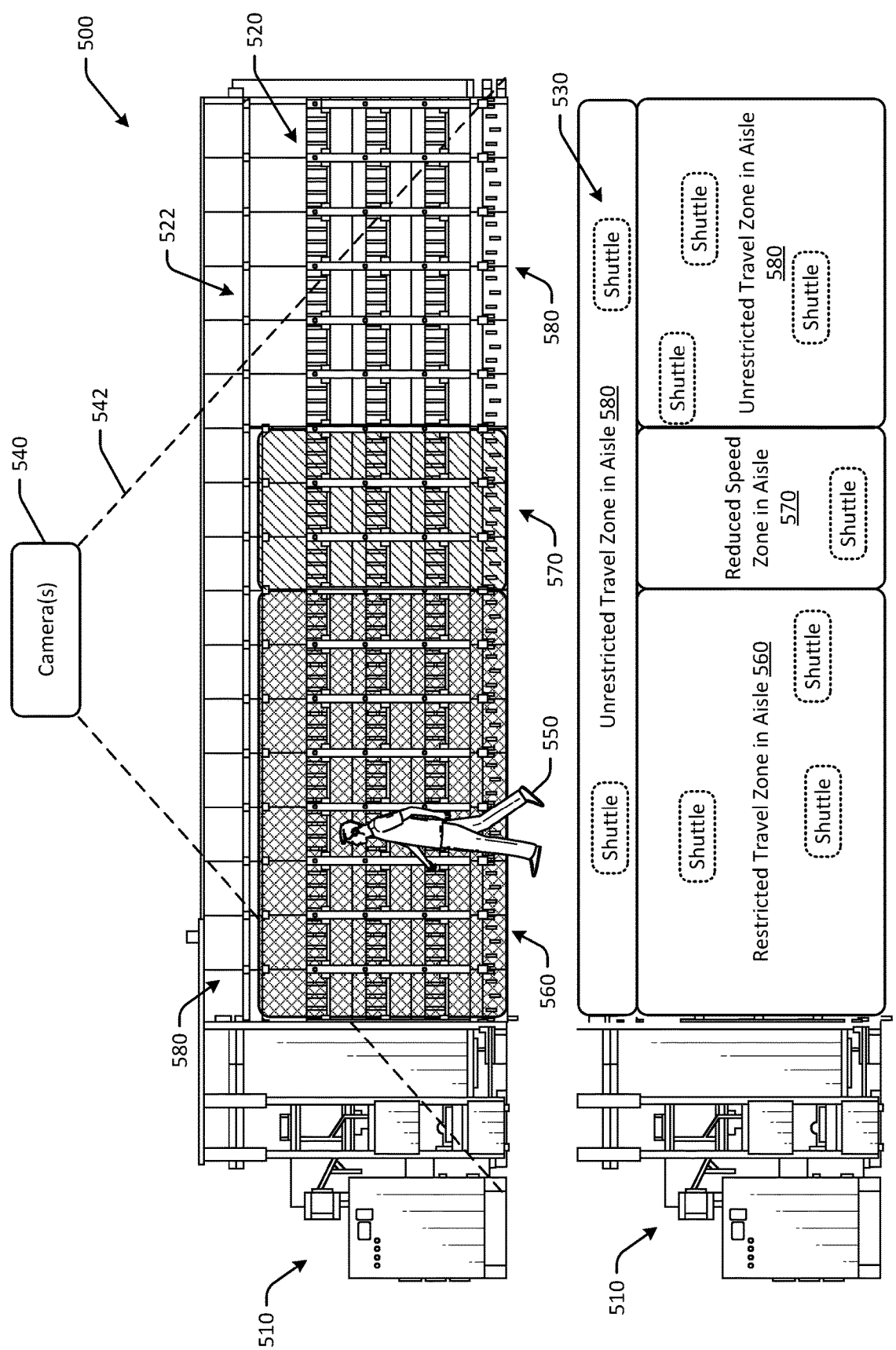
FIGS. 5A-5B are schematic illustrations of an active safety system for item sortation equipment with various shuttle travel zones in accordance with one or more embodiments of the disclosure.
Figure 5B:
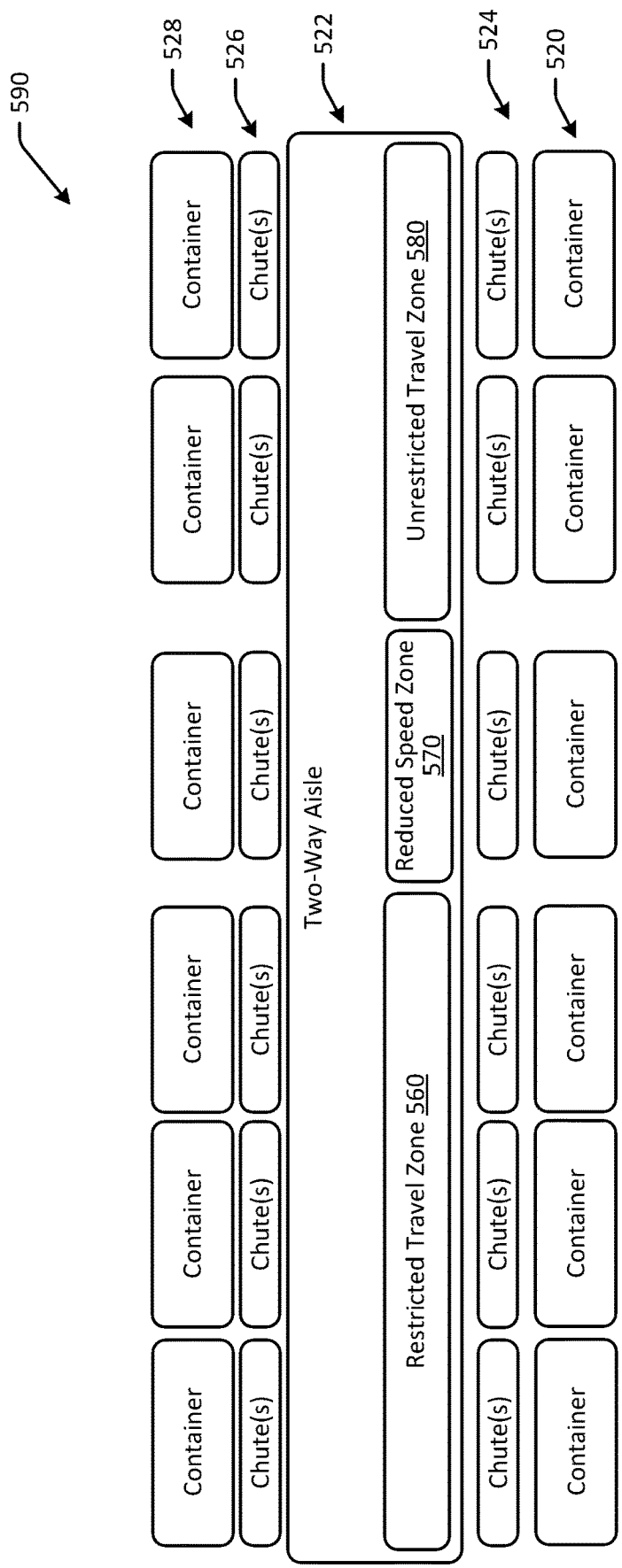

FIGS. 5A-5B are schematic illustrations of an active safety system for item sortation equipment 500 with various shuttle travel zones in accordance with one or more embodiments of the disclosure. Other embodiments may include additional or fewer components. The illustration of FIGS. 5A-5B may not be to scale, and may not be illustrated to scale with respect to other figures. The item sortation system illustrated in FIGS. 5A-5B may be the same universal item sorter discussed with respect to FIGS. 1-4.

In FIG. 5A, item sortation equipment 500, such as an item sortation machine or system, is depicted in side view. The item sortation equipment 500 may include a set of containers 520 disposed along a side of the item sortation equipment 500. Another set of containers may be disposed on another side of the item sortation equipment 500. Items may be delivered to the containers via one or more shuttles that travel through an aisle 522 of the item sortation equipment 500. The aisle 522 may be disposed between two sides of the item sortation equipment 500 and/or between two sets of containers on either side of the item sortation equipment 500. Shuttles may transport items from an induction portion 510 of the item sortation equipment 500 to one of the containers. In some embodiments, the aisle 522 may include an upper portion 580 at which at least two shuttles may move side-by-side, such that the aisle 522 is a two-way aisle.

The item sortation equipment 500 and/or an active safety system in communication with the item sortation equipment 500 may include one or more cameras. For example, the system may include a first camera 540 configured to image a first exterior portion of the item sortation equipment 500. The first camera 540 may be configured to detect the presence of a human 550 in a field of view 542 of the first camera 540.

The item sortation equipment 500 and/or an active safety system in communication with the item sortation equipment 500 may include one or more controllers and/or memory configured to store computer-executable instructions, and at least one processor configured to access the memory and execute the computer-executable instructions to perform various actions. For example, the controller may be configured to detect the presence of the human 550, and may be further configured to designate one or more of the chutes and/or portions of the aisle 522 as different zones. For example, the controller may be configured to designate a portion of the aisle 522 corresponding to the location of the human 550 as a restricted travel zone 560. In the restricted travel zone 560, shuttles may be paused in place while the human in present at that location. In addition, shuttles may be prevented from entering the restricted space of the aisle 522. The controller may be configured to designate a portion of the aisle 522 adjacent to the restricted travel zone 560 as a reduced speed zone 570. In the reduced speed travel zone 570, shuttles may operate at a reduced speed of travel relative to normal operation. This may facilitate quick pausing of the shuttles in that zone if the human 550 moves to a location closer to that zone. The controller may be configured to designate a portion of the aisle 522 adjacent to the reduced speed travel zone 570 as an unrestricted travel zone 580. In the unrestricted travel zone 580, shuttles may operate at normal speed and operation, as the shuttles and containers may be out of reach of the human 550. Shuttles 530 at various locations within the aisle 522 may be sent commands corresponding to the zone(s) in which the shuttles are positioned until the human 550 leaves, at which time full normal operation may resume.

The particular sizing and/or number of rows or columns that are to be designated any particular zone may be configurable and may be based on the dimensions of the machine. For example, the restricted travel zone may extend 6 feet in either direction of the human location, the reduced speed zone may be another 2 feet on either side of the restricted travel zone, and so forth.

Accordingly, in one example, the controller may detect a human present at a first location in the first exterior portion of the item sortation equipment 500, and may determine, using the first location, a first portion of the aisle 522 of the item sortation machine to designate the restricted travel zone 560, where shuttles of the item sortation machine in the restricted travel zone are prevented from movement. The controller may determine that a first shuttle of the item sortation machine is in the restricted travel zone 560, and may cause the first shuttle to be paused. The controller may determine a second portion of the aisle 522 to designate the reduced speed zone 570, and may determine that a second shuttle of the item sortation machine is in the reduced speed zone 570. The controller may be configured to cause a speed of travel of the second shuttle to be reduced.

In another example, the controller may detect, using a first overhead camera, a human present in the first exterior surrounding area, and may determine a first location of the human. The controller may determine a first subset of chutes of the first plurality of chutes corresponding to the first location, where a first portion of the aisle adjacent to the first subset of chutes is to be a designated restricted travel zone. The controller may determine that the first shuttle is in the first portion of the aisle, and may therefore cause the first shuttle to pause. The controller may determine a second subset of chutes adjacent to the first subset of chutes, where a second portion of the aisle adjacent to the second subset of chutes is to be designated a slow zone, and may determine that the second shuttle is in the second portion of the aisle. The controller may cause the second shuttle to reduce a speed of travel. The controller may determine that the second shuttle has delivered a second item to a destination chute or has otherwise delivered its payload, and may determine a path to the induction portion for the second shuttle that avoids the first portion of the aisle.

In FIG. 5B, a schematic illustration of the item sortation system 500 is depicted in a top view 590. As illustrated in FIG. 5B, the aisle 522 may extend down a middle of the item sortation system 500. A first set of chutes 524 may be disposed along a first side of the item sortation system 500, and a first set of containers 520 may be disposed adjacent to the respective chutes of the first set of chutes 524. The containers may be removably positioned in slots of the item sortation system 500. A second set of chutes 526 may be disposed along a second side of the item sortation system 500, and a second set of containers 528 may be disposed adjacent to the respective chutes of the second set of chutes 526. The containers may be removably positioned in slots of the item sortation system 500.

The aisle 522 may be a two-way aisle, such that shuttles in opposite directions can pass each other at the same time when traversing the aisle 522. A first side of the aisle 522 may correspond to the first side of the item sortation system 500, and a second side of the aisle 522 may correspond to the second side of the item sortation system 500. Because a human may be present on the first side of the item sortation system 500 and not on the second side of the item sortation system, the restricted travel zone 560 may be for the first side of the aisle 522, as depicted in FIG. 5B. Similarly, the reduced speed zone 570 and the unrestricted travel zone 580 may be designated for the portions of the aisle 522 corresponding to the first side of the aisle 522. The second side of the aisle 522 may be used for normal operation.

Figure 6:
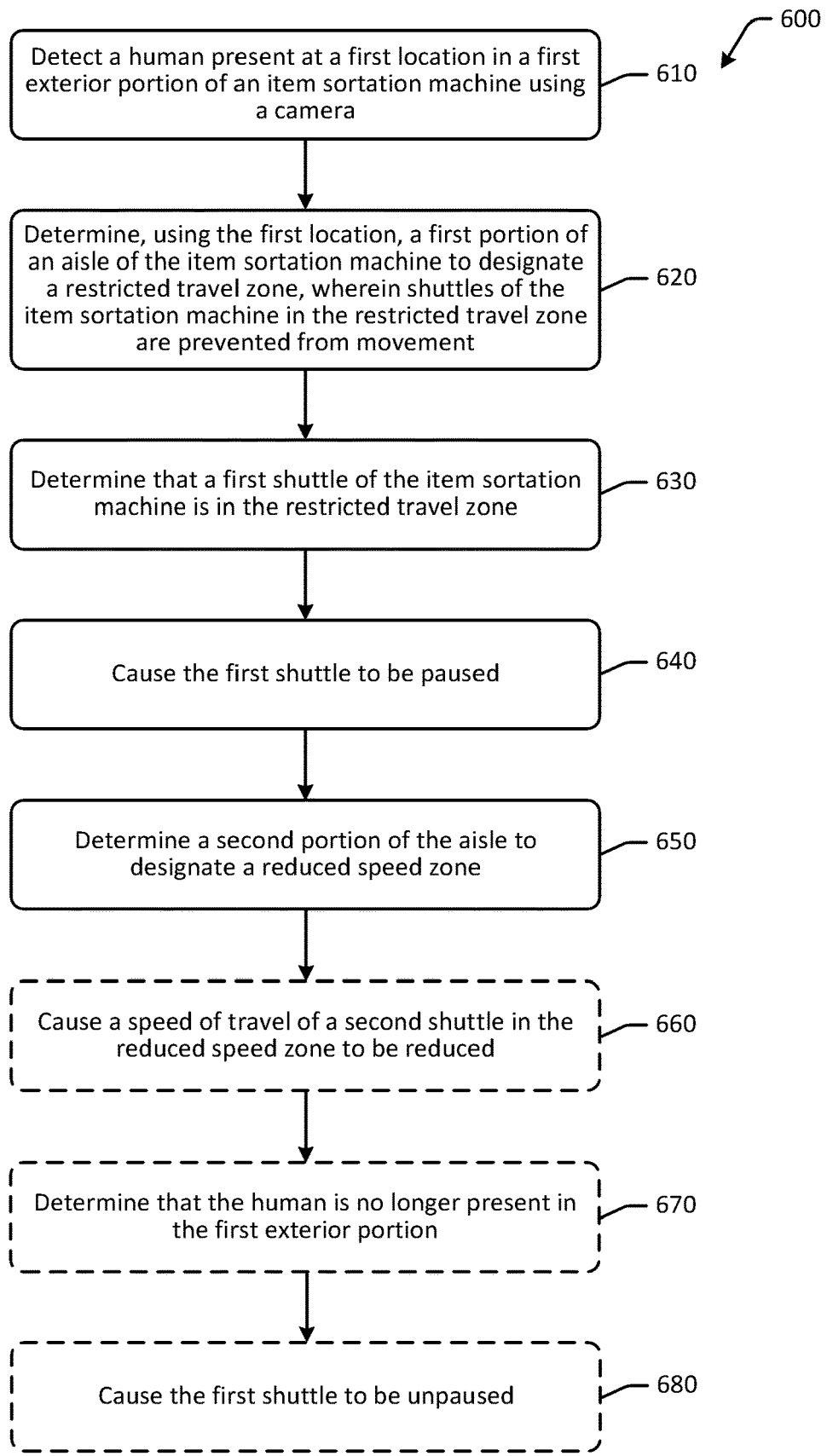
FIG. 6 is a schematic illustration of an example process flow for an active safety system for item sortation equipment in accordance with one or more example embodiments of the disclosure.

FIG. 6 depicts an example process flow 600 for active safety in accordance with one or more example embodiments of the disclosure. While example embodiments of the disclosure may be described in the context of tracking items and shuttles in an aisle of an item sortation system, it should be appreciated that the disclosure is more broadly applicable to any type of item sortation. Some or all of the blocks of the process flows in this disclosure may be performed in a distributed manner across any number of devices. The operations of the process flow 600 may be optional and may be performed in a different order.

At block 610 of the process flow 600, computer-executable instructions stored on a memory of a device, such as a remote server or a controller, may be executed to detect a human present at a first location in a first exterior portion of an item sortation machine using a camera. For example, an item/shuttle tracking engine and/or one or more item/shuttle tracking modules at a controller may detect a human present at a first location of a first exterior portion of an item sortation machine using a camera. Some embodiments may include more than one camera, such as a second camera configured to image a second exterior portion of the item sortation machine. The controller may use image data from the camera to detect the presence of a human along a first side of the item sortation machine. The controller may process the image data to determine a location of the human. In some embodiments, the human may remain in the same location for a threshold length of time before the first location is determined. For example, the human may be determined to remain in the same location, or within a radius of the same location, for a threshold length of time, such as about 5 seconds, before the first location is determined and/or shuttle movement is impacted. Accordingly, if a human is just passing by the item sortation machine and does not stop in place for the threshold length of time, the first location may not be determined. Similarly, if a human is simply removing and/or replacing a tote, shuttle movement may not be impacted. For example, in some embodiments, the controller may determine that the human is present within a predetermined distance of the first location prior to causing the first shuttle to be paused. Accordingly, the user may stay within a certain space or range of the predetermined distance before shuttle operation is stopped, as this may indicate the user is stopping next to the item sortation machine.

At block 620 of the process flow 600, computer-executable instructions stored on a memory of a device, such as a remote server or a controller, may be executed to determine, using the first location, a first portion of an aisle of the item sortation machine to designate a restricted travel zone, wherein shuttles of the item sortation machine in the restricted travel zone are prevented from movement. For example, an item/shuttle tracking engine and/or one or more item/shuttle tracking modules at a controller may determine, using the first location, a first portion of an aisle of the item sortation machine to designate a restricted travel zone, wherein shuttles of the item sortation machine in the restricted travel zone are prevented from movement. The first portion of the aisle may be the portion of the aisle corresponding to containers and/or chutes that are within reach of the human (with or without a tool). Shuttles in the portion of the aisle may be paused in place, and other shuttles may be prevented from entering the restricted zone.

At block 630 of the process flow 600, computer-executable instructions stored on a memory of a device, such as a remote server or a controller, may be executed to determine that a first shuttle of the item sortation machine is in the restricted travel zone. For example, an item/shuttle tracking engine and/or one or more item/shuttle tracking modules at a controller may determine that a first shuttle of the item sortation machine is in the restricted travel zone. The controller may determine the location of the first shuttle based at least in part on a current location of the first shuttle, a camera disposed in the aisle, a destination chute associated with the first shuttle, or another parameter.

At block 640 of the process flow 600, computer-executable instructions stored on a memory of a device, such as a remote server or a controller, may be executed to cause the first shuttle to be paused. For example, an item/shuttle tracking engine and/or one or more item/shuttle tracking modules at a controller may cause the first shuttle to be paused. The controller may send a pause command or related signal to the first shuttle to cause the first shuttle to stop moving.

At block 650 of the process flow 600, computer-executable instructions stored on a memory of a device, such as a remote server or a controller, may be executed to determine a second portion of the aisle to designate a reduced speed zone. For example, an item/shuttle tracking engine and/or one or more item/shuttle tracking modules at a controller may determine a second portion of the aisle to designate a reduced speed zone. The reduced speed zone may be adjacent to one or both sides of the restricted travel zone. Shuttles in the reduced speed zone may travel at a reduced rate of speed relative to normal operation, such as about 50% a normal speed of travel.

At optional block 660 of the process flow 600, computer-executable instructions stored on a memory of a device, such as a remote server or a controller, may be executed to cause a speed of travel of a second shuttle in the reduced speed zone to be reduced. For example, an item/shuttle tracking engine and/or one or more item/shuttle tracking modules at a controller may cause a speed of travel of a second shuttle in the reduced speed zone to be reduced. The controller may send a slow down command or related signal to the second shuttle to cause the second shuttle to reduce a speed of travel. Accordingly, if the human moves quickly, the shuttles in the reduced speed zone can rapidly stop moving or pause.

At optional block 670 of the process flow 600, computer-executable instructions stored on a memory of a device, such as a remote server or a controller, may be executed to determine that the human is no longer present in the first exterior portion. For example, an item/shuttle tracking engine and/or one or more item/shuttle tracking modules at a controller may determine that the human is no longer present in the first exterior portion. The controller may use image data from the camera to determine that the user has moved from the first location.

At optional block 680 of the process flow 600, computer-executable instructions stored on a memory of a device, such as a remote server or a controller, may be executed to cause the first shuttle to be unpaused. For example, an item/shuttle tracking engine and/or one or more item/shuttle tracking modules at a controller may cause the first shuttle to be unpaused. The controller may send an unpause command or related signal to the first shuttle to cause the first shuttle to resume operation.

If the human moves from the first location to a second location that is in the vicinity of the item sortation machine, the controller may dynamically re-determine the restricted travel zone, the reduced speed zone, and so forth. For example, the controller may detect the human present at a second location in the first exterior portion, and may determine, using the second location, a second portion of the aisle of the item sortation machine to designate a restricted travel zone. The controller may determine the first portion of the aisle of the item sortation system is to be designated an unrestricted travel zone, and cause the first shuttle to be unpaused.

Figure 7:
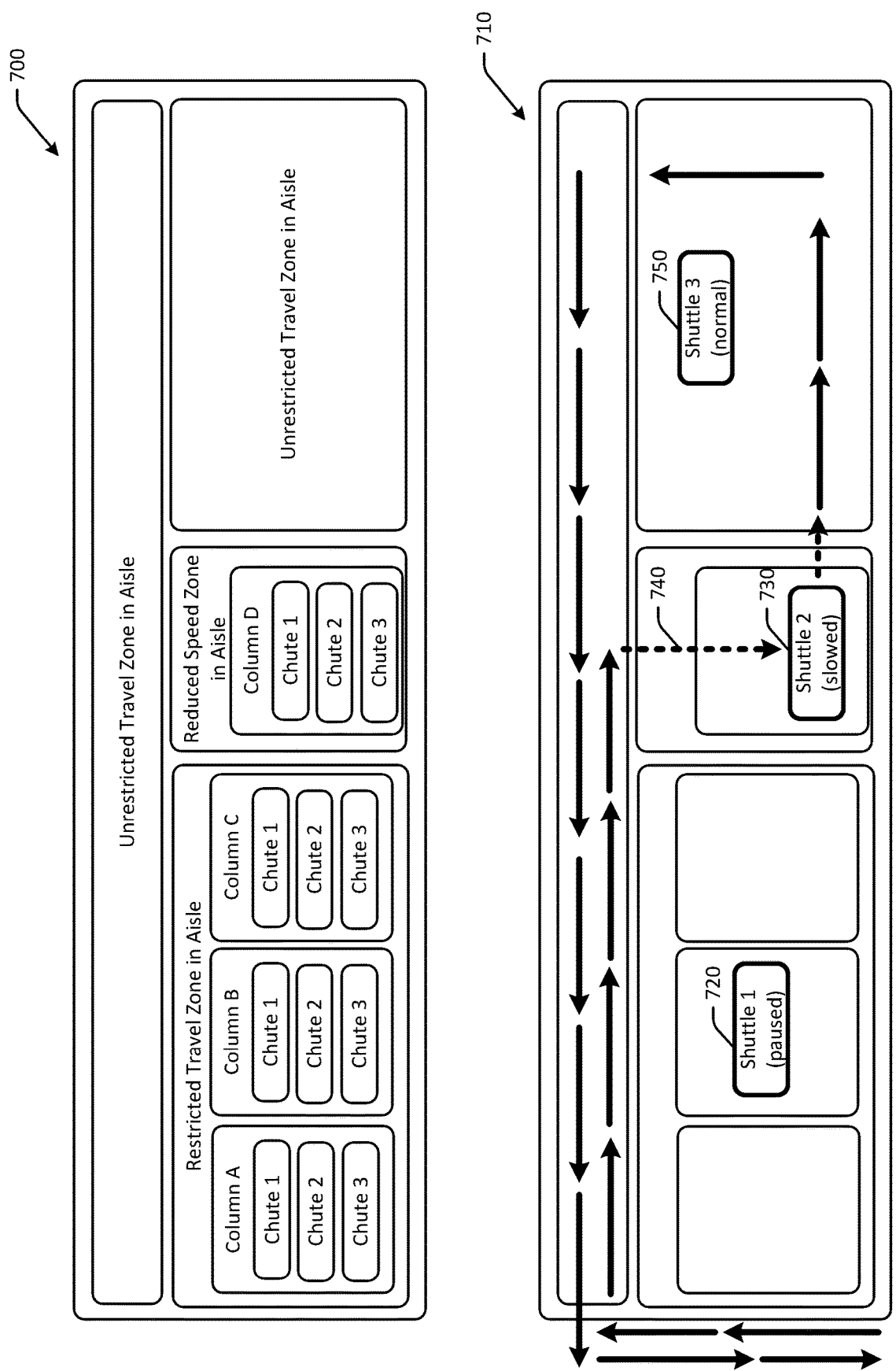
FIG. 7 is a schematic illustration of an item sortation system with an active safety system and associated travel zones, along with example shuttle routing, in accordance with one or more embodiments of the disclosure.

FIG. 7 is a schematic illustration of an item sortation system with an active safety system and associated travel zones, along with example shuttle routing, in accordance with one or more embodiments of the disclosure. Other embodiments may include additional or fewer components. The illustration of FIG. 7 may not be to scale, and may not be illustrated to scale with respect to other figures. The item sortation system illustrated in FIG. 7 may be the same universal item sorter discussed with respect to FIGS. 1-6.

In FIG. 7, a first schematic illustration 700 depicts sample travel zones for an item sortation system in a side view. For example, the depicted travel zones correspond to a portion of the aisle behind a container or chute side of the item sortation system. The item sortation system may have another container or chute side on the opposite side. The travel zones may be applicable to a portion of the aisle corresponding to the side of the machine at which a human is present. The other side of aisle and the item sortation machine may operate without restriction if no human is present. In the example of FIG. 7, the depicted side of the item sortation machine may be a front side of the item sortation machine, and may include a number of chutes arranged in columns. For example, a first column (e.g., Column A, etc.) may include one or more discrete chutes, a second column (e.g., Column B, etc.) may include one or more discrete chutes, and so forth.

A human may be detected to be present in front of Column B. Accordingly, the item sortation system and/or an associated active safety system may determine that all of the chutes in Column B, as well as Column A and Column C, or any other columns or rows that may be within reach of the human, are to be designated a restricted travel zone in the aisle of the item sortation system. As a result, shuttles may not enter the portion of the aisle corresponding to the restricted travel zone, and shuttles already present in the restricted travel zone may be paused and prevented from delivering items.

The item sortation system and/or an associated active safety system may determine one or more rows or columns adjacent to the restricted travel zone to designate as reduced speed zones. Shuttles may enter, exit, and/or pass through the reduced speed zone at reduced speeds relative to normal operation. This may create a buffer, such that if the human walks towards the reduced speed zone, the reduced speed zone can be designated a restricted travel zone, and the shuttles may be paused more quickly than normal due to the reduced speed of movement.

The item sortation system and/or an associated active safety system may determine one or more rows or columns adjacent to the reduced speed travel zone to designate as unrestricted travel zones. The unrestricted travel zones may be portions of the aisle through which shuttle movement may be normal and operation of the item sortation system may continue uninterrupted. An upper portion of the aisle may be unreachable by humans and may therefore, in some embodiments, be permanently designated an unrestricted travel zone. As a result, shuttles may use the upper portion of the aisle to move to and from an induction portion of the item sortation machine.

As a human walks past the item sortation system and/or moves from one location to another, the different designated zones may shift accordingly. For example, the chutes or columns nearest the human may be restricted travel zones. Chutes designated restricted travel zones may move along with the human, such that designations of chutes may change dynamically as the location of the human changes. In this manner, the human may be safe at all times, and the travel zone designations may be dynamically updated according to a location of the human.

A second schematic illustration 710 depicts sample shuttles positioned in the respective restricted, reduced speed, and unrestricted travel zones, as well as sample shuttle routing to avoid the restricted travel zone. For example, a first shuttle 720 may be determined to be in a portion of the aisle corresponding to the restricted travel zone, and may therefore be sent a command or instruction to pause by the computer system. A second shuttle 730 may be determined to be in a portion of the aisle corresponding to the reduced speed travel zone, and may therefore be sent a command or instruction to reduce a speed of travel by the computer system. The reduction in speed of travel may be a reduction in speed of 50%, a reduction in speed of 60%, a reduction in speed of 70%, or a different reduction in speed. A third shuttle 750 may be determined to be in a portion of the aisle corresponding to the unrestricted travel zone, and may therefore operate normally and may continue to deliver items.

In the illustrated example, the second shuttle 730 may follow a rerouted path 740 to avoid the restricted travel zone. Accordingly, the second shuttle 730 may move upwards from the induction portion, over the top of the restricted travel zone, and may move down Column D at a reduced speed in the reduced speed zone (where the solid arrows represent normal shuttle speed and the dashed lines represent reduced shuttle speed). The second shuttle 730 may deliver its item to a chute in Column D, and may exit the reduced speed zone, and return to the induction portion of the item sortation system by way of the unrestricted travel zone. Accordingly, the item sortation system may continue functioning while a portion of the aisle is subject to a travel zone restriction.

In some embodiments, the computer system may determine that a shuttle is to transport an item from the induction portion of the item sortation machine to a chute of the item sortation machine, and may determine a path for the third shuttle through the aisle that avoids the restricted travel zone, even if the path is longer than passing through the restricted travel zone.

For example, a computer system and/or controller may detect, using a first camera configured to image an exterior portion of the item sortation machine, a human present at a first location in the exterior portion, and may determine, using the first location, a first portion of an aisle of the item sortation machine to designate a restricted travel zone, where shuttles of the item sortation machine in the restricted travel zone are prevented from movement. The computer system may determine that a first shuttle of the item sortation machine is in the restricted travel zone, and may cause the first shuttle to be paused. The computer system may determine a second portion of the aisle to designate a reduced speed zone, and may determine that a second shuttle of the item sortation machine is in the reduced speed zone. The computer system may cause speed of travel of the second shuttle to be reduced. In some embodiments, the computer system may determine that the second shuttle is to deliver an item to a chute of the item sortation system corresponding to the first portion of the aisle (which may be in the restricted travel zone), and may therefore determine a replacement chute for the item. The computer system may cause the second shuttle to be redirected to the replacement chute. The computer system may determine a third portion of the aisle to designate an unrestricted travel zone, and may determine that a second shuttle of the item sortation machine is in the unrestricted zone. The computer system may determine that the second shuttle has delivered a first item, and may cause the second shuttle to avoid the restricted travel zone during a return to an induction portion of the item sortation machine. For example, the second shuttle may be routed through the unrestricted travel zone and/or the reduced speed zone to return to the induction portion.

In some embodiments, the computer system may be configured to determine that a shuttle is ready to receive an item at the induction portion of the item sortation system, and may determine that the second item is designated for a chute of the item sortation system corresponding to the first portion of the aisle (which may be in the restricted travel zone). The computer system may therefore cause the item to be routed to a manual exception handling area, and may determine a subsequent item to load onto the second shuttle. Accordingly, instead of determining replacement chutes or waiting for restricted travel zones to be removed, items destined for a restricted chute or container may be processed at a later time or routed to a manual sortation or handling section, so as to not cause additional delays for other items.

Figure 8:
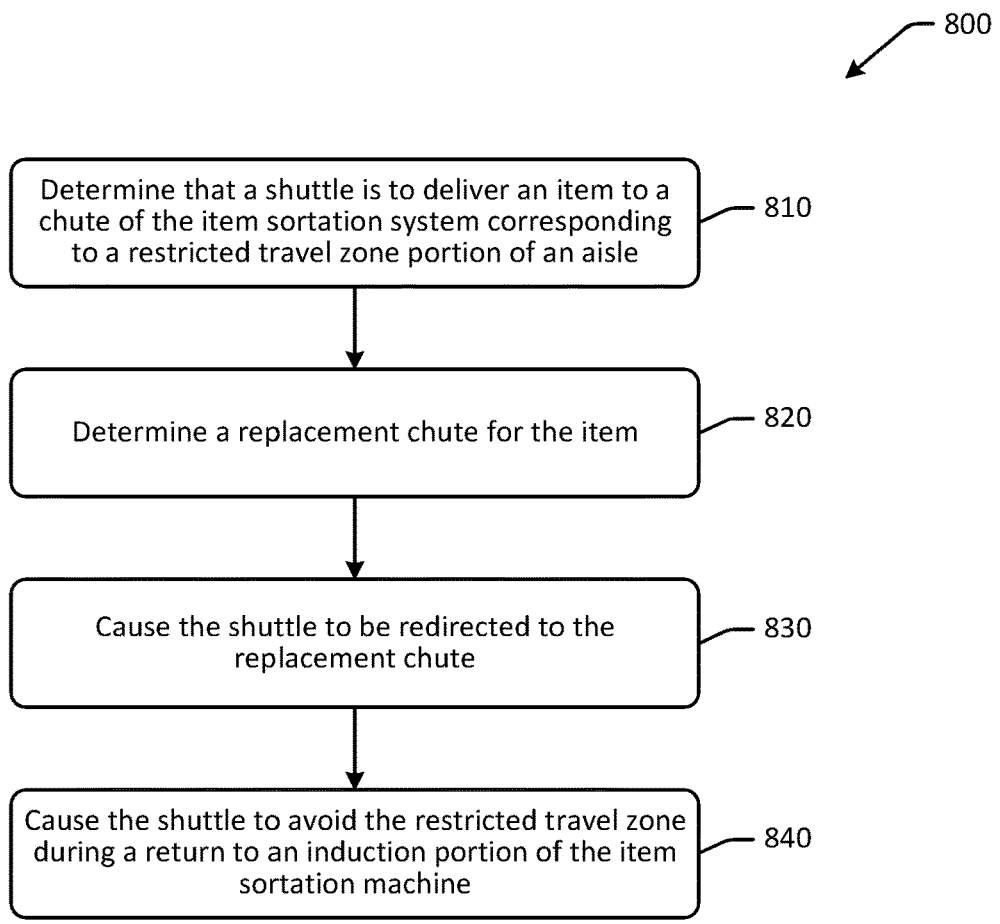
FIG. 8 is a schematic illustration of an example process flow for dynamic shuttle rerouting in accordance with one or more example embodiments of the disclosure.

FIG. 8 depicts an example process flow 800 for dynamic shuttle rerouting in accordance with one or more example embodiments of the disclosure. While example embodiments of the disclosure may be described in the context of tracking users and shuttles in an aisle of an item sortation system, it should be appreciated that the disclosure is more broadly applicable to any type of item sortation equipment. Some or all of the blocks of the process flows in this disclosure may be performed in a distributed manner across any number of devices. The operations of the process flow 800 may be optional and may be performed in a different order.

At block 810 of the process flow 800, computer-executable instructions stored on a memory of a device, such as an item sortation computer system or an external controller, may be executed to determine that a shuttle is to deliver an item to a chute of an item sortation system corresponding to a restricted travel zone portion of an aisle. For example, one or more item/shuttle tracking modules at a computer system may determine that a shuttle is to deliver an item to a chute of an item sortation system corresponding to a restricted travel zone portion of an aisle. One or more shuttles may transport items through an aisle of an item sortation system, and may deliver items to specific chutes and/or containers. The destination of an item may be communicated to a shuttle when the item is inducted into the item sortation machine and/or loaded onto the shuttle. The computer system may determine that a certain set of containers and/or chutes are restricted. For example, after an item is loaded onto a shuttle, a human may come into the vicinity of the item sortation system, and a corresponding portion of the aisle may be designated a restricted travel zone for the shuttles to prevent injury to the human. The restricted travel zone portion may be a portion of the aisle that may be accessible to the human. The computer system may determine that the shuttle on which the item was loaded is destined for a chute or a container that has become restricted. Accordingly, the shuttle may be unable to complete transport of the item and/or deliver the item while the chute or container is restricted.

At block 820 of the process flow 800, computer-executable instructions stored on a memory of a device, such as the item sortation computer system or an external controller, may be executed to determine a replacement chute for the item. For example, one or more item/shuttle tracking modules at a computer system may determine a replacement chute for the item. Because the shuttle was transporting the item to a restricted travel zone, or because the chute became part of a restricted travel zone while en route to the chute, the computer system may dynamically reroute the shuttle to a replacement destination, and may therefore dynamically determine a replacement chute. For example, the computer system may determine an unallocated container or chute in an unrestricted travel zone and cause the shuttle to deliver the item to the unallocated container.

The computer system may maintain an association between the replacement chute and the original destination chute, such that in the event the item is part of a multi-item order, both the original container and the container adjacent to the replacement chute can be retrieved from the item sortation system. Accordingly, the items in a multi-item order can be packed together even though the items are in different containers. In this manner, delivery of the item on the shuttle is not delayed due to the restricted travel zone.

At block 830 of the process flow 800, computer-executable instructions stored on a memory of a device, such as the item sortation computer system or an external controller, may be executed to cause the shuttle to be redirected to the replacement chute. For example, one or more item/shuttle tracking modules at a computer system may cause the shuttle to be redirected to the replacement chute. The computer system may send a command or data indicating the updated destination to the shuttle, and the shuttle may redirect itself to the replacement chute. In some embodiments, the computer system may send the shuttle routing instructions for a path through the item sortation system to avoid the restricted travel zone en route to the replacement chute.

At block 840 of the process flow 800, computer-executable instructions stored on a memory of a device, such as the item sortation computer system or an external controller, may be executed to cause the shuttle to avoid the restricted travel zone during a return to an induction portion of the item sortation machine. For example, one or more item/shuttle tracking modules at a computer system may cause the shuttle to avoid the restricted travel zone during a return to an induction portion of the item sortation machine. After the shuttle delivers the item to the replacement chute, the shuttle may return to the induction portion to retrieve another item. However, rather than the shuttle staying in place and/or waiting for the restricted travel zone to be cleared, the computer system may cause the shuttle to return to the induction portion via a route that passes through the unrestricted travel zone and/or reduced speed travel zone, so as to avoid impeding return of the shuttle to the induction portion. As a result, the shuttle may continue to retrieve and deliver items while avoiding the restricted travel zone.

Figure 9:
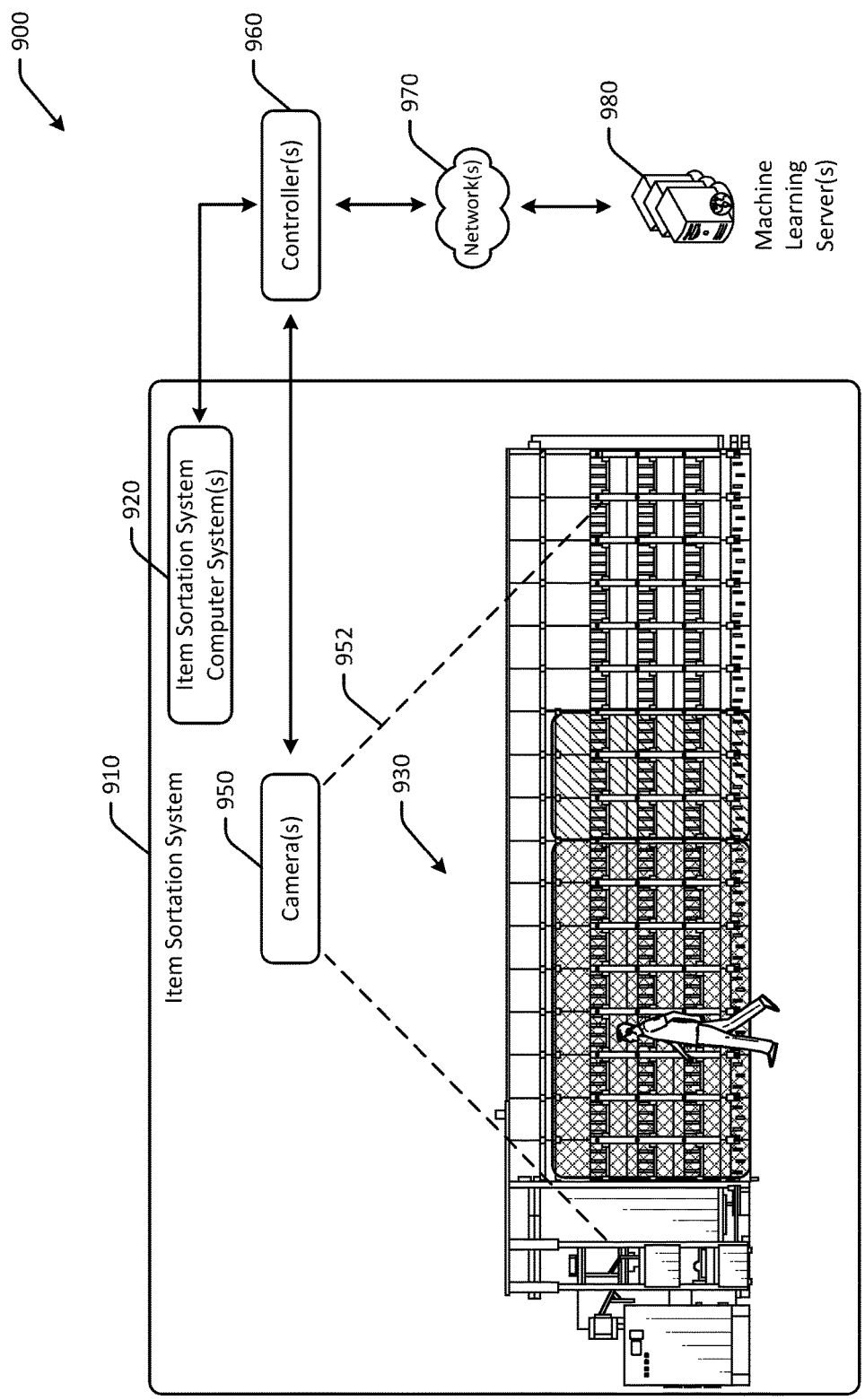
FIG. 9 is a schematic illustration of an item sortation system with an active safety system and associated controller(s) in accordance with one or more embodiments of the disclosure.

FIG. 9 is a schematic illustration of an item sortation system with an active safety system and associated controller(s) in accordance with one or more embodiments of the disclosure. Other embodiments may include additional or fewer components. The illustration of FIG. 9 may not be to scale, and may not be illustrated to scale with respect to other figures. The item sortation system illustrated in FIG. 9 may be the same universal item sorter discussed with respect to FIGS. 1-8.

In FIG. 9, the item sortation system and active safety system 900 may include an item sortation system 910 having an item sortation system controller or computer system 920. The item sortation system computer system 920 may be configured to control one or more aspects of the item sortation system 910, such as shuttle movement. The item sortation system 910 may include one or more shuttles that transport items through an aisle 930 of the item sortation system 910. The shuttles may transport the items to designated drop off locations via the aisle 930.

The active safety system may be integrated with the item sortation system 910 or may be a standalone system that can be retrofitted to existing item sortation systems. The active safety system may include one or more cameras 950 that may be disposed adjacent to the item sortation system 910. For example, the cameras 950 may be overhead cameras and may be disposed on one or both sides of the item sortation system 910. The shuttles may move laterally and vertically in the aisle, and may move across a number of rows or columns. The camera(s) 950 may have respective fields of view 952 that include the vicinity of the external sides of the item sortation system 910. Accordingly, the one or more cameras may image the exterior side(s) of the item sortation system 910, and may be used to detect the presence and/or movement of humans that are located near the item sortation system 910. In the illustrated example, the camera 950 may be configured to image the vicinity adjacent to a first exterior portion of the item sortation system 910. Other cameras may be included to image the vicinity adjacent to a second exterior portion of the item sortation system 910, such as an opposite side.

The active safety system may include one or more controllers 960. The controller 960 may be a standalone controller or may be integrated into the item sortation computer system 920. The controller 960 may be in wired or wireless communication with the item sortation computer system 920. The controller 960 may use the cameras 950 to capture image data. The controller 960 may send the image data to one or more machine learning servers 980 for processing via one or more networks 970. The machine learning servers 980 may determine one or more outputs, such as whether a human is present, whether any portions of the item sortation system aisle 930 are to be designated restricted travel zones, reduced speed zones, unrestricted travel zones, and so forth, which may be sent as signals or commands to the controller 960. In some embodiments, the machine learning servers 980 may be local. The controller 960 may communicate with the item sortation system computer system 920 to perform one or more actions, such as coordinate travel zone designations, change shuttle parameters or routing, pause or unpause shuttles, and the like. In some embodiments, the determinations as to whether a human is present and/or determinations related to travel zone designations may be performed locally at the item sortation computer system 920 and/or the controller 960.

In one example, the active safety system may determine, using image data from the camera 950, that a human is present in the vicinity of the item sortation system. The active safety system may determine that a first set of chutes or containers near the human are to be designated a restricted travel zone, and that a second set of chutes or containers adjacent to the restricted travel zone are to be designated a reduced speed zone, and so forth. The active safety system may determine shuttles that are present in the respective zones, and may cause the shuttles in the restricted travel zone to pause, and shuttles in the reduced speed travel zone to move at a reduced speed. The active safety system may determine whether the human moves from a first location to a second location, and may update the travel zone designations accordingly, so as to correspond to the human movement. The active safety system may determine that the human has left the vicinity of the item sortation system 910 and may cause the shuttles to resume normal operation.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 10:
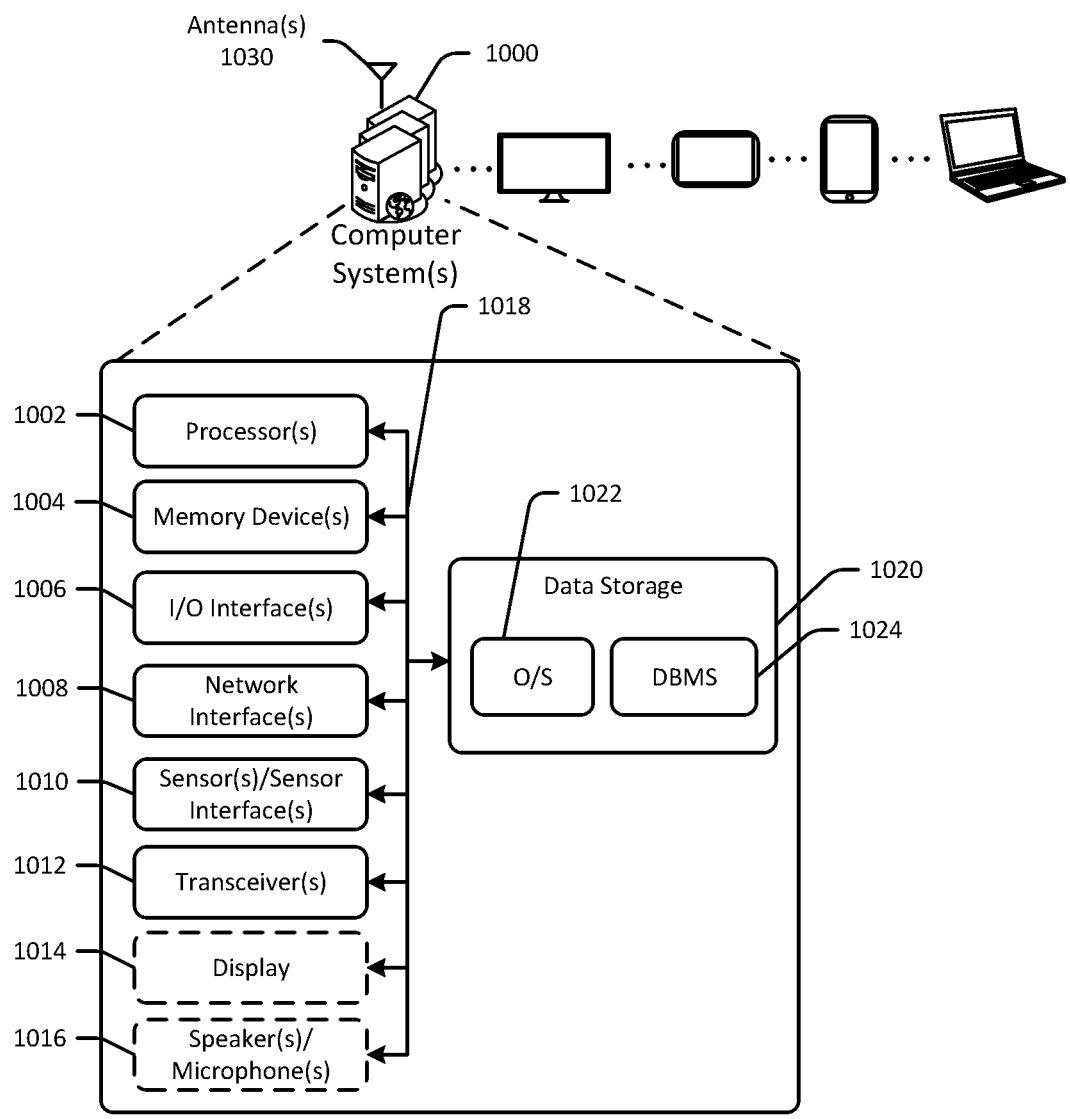
FIG. 10 schematically illustrates an example architecture of a computer system associated with an item sortation system and/or active safety system in accordance with one or more embodiments of the disclosure.

FIG. 10 is a schematic block diagram of one or more illustrative computer system(s) 1000 in accordance with one or more example embodiments of the disclosure. The computer system(s) 1000 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1000 may correspond to an illustrative device configuration for the controller(s) of the camera-based tracking systems and/or sortation systems of FIGS. 1-9.

The computer system(s) 1000 may be configured to communicate with one or more servers, user devices, or the like. The computer system(s) 1000 may be configured to sort items into one or more bins, control activation and/or movement of one or more sortation system shuttles, detect human presence, determine restricted travel zones, unrestricted travel zones, reduced speed zones, and so forth, control shuttle parameters, such as speed, determine inventory statuses, generate notifications, and so forth.

The computer system(s) 1000 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1000 may include one or more processors (processor(s)) 1002, one or more memory devices 1004 (also referred to herein as memory 1004), one or more input/output (I/O) interface(s) 1006, one or more network interface(s) 1008, one or more sensor(s) or sensor interface(s) 1010, one or more transceiver(s) 1012, one or more optional display(s) 1014, one or more optional microphone(s) 1016, and data storage 1020. The computer system(s) 1000 may further include one or more bus(es) 1018 that functionally couple various components of the computer system(s) 1000. The computer system(s) 1000 may further include one or more antenna(s) 1030 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit the exchange of information (e.g., data (including computer-executable code), signaling, etc.) between various components of the computer system(s) 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1004 of the computer system(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to the memory 1004 for use by the processor(s) 1002 during the execution of the computer-executable instructions. Moreover, output data generated as a result of execution of the computer-executable instructions by the processor(s) 1002 may be stored initially in the memory 1004, and may ultimately be copied to the data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like. Some or all of these module(s) may be sub-module(s). Any of the components depicted as being stored in the data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in the data storage 1020 may support functionality described in reference to corresponding components named earlier in this disclosure.

The data storage 1020 may further store various types of data utilized by the components of the computer system(s) 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute the computer-executable instructions loaded therein. For example, the processor(s) 1002 may be configured to execute the computer-executable instructions of the various program module(s), applications, engines, or the like of the computer system(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to other illustrative components depicted as being stored in the data storage 1020, the O/S 1022 may be loaded from the data storage 1020 into the memory 1004 and may provide an interface between other application software executing on the computer system(s) 1000 and the hardware resources of the computer system(s) 1000. More specifically, the O/S 1022 may include a set of computer-executable instructions for managing the hardware resources of the computer system(s) 1000 and for providing common services to other application programs (e.g., managing memory allocation among various application programs). In certain example embodiments, the O/S 1022 may control execution of the other program module(s). The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1000 is a mobile device, the DBMS 1024 may be any suitable lightweight DBMS optimized for performance on a mobile device.

Referring now to other illustrative components of the computer system(s) 1000, the input/output (I/O) interface(s) 1006 may facilitate the receipt of input information by the computer system(s) 1000 from one or more I/O devices as well as the output of information from the computer system(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1030 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1000 may further include one or more network interface(s) 1008 via which the computer system(s) 1000 may communicate with any of a variety of other systems, platforms, networks, devices, and so forth. The network interface(s) 1008 may enable communication, for example, with one or more wireless routers, one or more host servers, one or more web servers, and the like via one or more networks.

The antenna(s) 1030 may include any suitable type of antenna depending, for example, on the communications protocols used to transmit or receive signals via the antenna(s) 1030. Non-limiting examples of suitable antennas may include directional antennas, non-directional antennas, dipole antennas, folded dipole antennas, patch antennas, multiple-input multiple-output (MIMO) antennas, or the like. The antenna(s) 1030 may be communicatively coupled to one or more transceivers 1012 or radio components to which or from which signals may be transmitted or received.

As previously described, the antenna(s) 1030 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1030 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1030 may be configured to transmit or receive radio frequency signals within any suitable frequency range forming part of the unlicensed portion of the radio spectrum.

The antenna(s) 1030 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1030—transmitting or receiving radio frequency (RF) signals in the bandwidth and/or channels corresponding to the communications protocols utilized by the computer system(s) 1000 to communicate with other devices. The transceiver(s) 1012 may include hardware, software, and/or firmware for modulating, transmitting, or receiving—potentially in cooperation with any of antenna(s) 1030—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computer system(s) 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1014 may be configured to output light and/or render content. The optional speaker(s)/microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the computer system(s) 1000 may include alternate and/or additional hardware, software, or firmware components beyond those described or depicted without departing from the scope of the disclosure. More particularly, it should be appreciated that software, firmware, or hardware components depicted as forming part of the computer system(s) 1000 are merely illustrative and that some components may not be present or additional components may be provided in various embodiments. While various illustrative program module(s) have been depicted and described as software module(s) stored in the data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. An item sortation system comprising:
an induction portion at which items for sortation are inducted into the item sortation system;
an aisle disposed about a center of the item sortation system;
a first plurality of chutes disposed along a first side of the aisle;
a second plurality of chutes disposed along a second side of the aisle;

a first shuttle comprising a conveyor belt, the first shuttle configured to transport a first item of the items for sortation using the aisle from the induction portion to a chute of the first plurality of chutes or the second plurality of chutes;

a first overhead camera configured to image a first exterior surrounding area of the item sortation system, the first exterior surrounding area adjacent to the first plurality of chutes; and a second overhead camera configured to image a second exterior surrounding area of the item sortation system, the second exterior surrounding area adjacent to the second plurality of chutes;

memory configured to store computer-executable instructions; and at least one processor configured to access the memory and execute the computer-executable instructions to:
  detect, using the first overhead camera, a human present in the first exterior surrounding area;
  determine a first location of the human;
  determine a first subset of chutes of the first plurality of chutes corresponding to the first location, wherein a first portion of the aisle adjacent to the first subset of chutes is to be a designated restricted travel zone;
  determine that the first shuttle is in the first portion of the aisle; and
  cause the first shuttle to pause.

2. The item sortation system of claim 1, further comprising:
  a second shuttle;
  wherein the at least one processor is further configured to access the memory and execute the computer-executable instructions to:
    determine a second subset of chutes adjacent to the first subset of chutes, wherein a second portion of the aisle adjacent to the second subset of chutes is to be designated a slow zone;
    determine that the second shuttle is in the second portion of the aisle; and
    cause the second shuttle to reduce a speed of travel.

3. The item sortation system of claim 2, wherein the at least one processor is further configured to access the memory and execute the computer-executable instructions to:
  determine that the second shuttle has delivered a second item to a destination chute; and
  determine a path to the induction portion for the second shuttle that avoids the first portion of the aisle.

4. The item sortation system of claim 3, wherein the at least one processor is further configured to access the memory and execute the computer-executable instructions to:
  determine that the second shuttle is ready to receive a third item at the induction portion;
  determine that the third item is designated for a chute in the first subset of chutes;
  cause the third item to be routed to a manual exception handling area;
  determine that a fourth item is designated for a chute in the second subset of chutes; and
  cause the fourth item to be loaded onto the second shuttle.

5. A system for an item sortation machine comprising:
  a first camera configured to image a first exterior portion of the item sortation machine;
  memory configured to store computer-executable instructions; and
  at least one processor configured to access the memory and execute the computer-executable instructions to:
    detect a human present at a first location in the first exterior portion;
    determine, using the first location, a first portion of an aisle of the item sortation machine to designate a restricted travel zone, wherein shuttles of the item sortation machine in the restricted travel zone are prevented from movement;
    determine that a first shuttle of the item sortation machine is in the restricted travel zone; and
    cause the first shuttle to be paused.

6. The system of claim 5, wherein the at least one processor is further configured to access the memory and execute the computer-executable instructions to:
  determine a second portion of the aisle to designate a reduced speed zone;
  determine that a second shuttle of the item sortation machine is in the reduced speed zone; and
  cause a speed of travel of the second shuttle to be reduced.

7. The system of claim 6, wherein the at least one processor is further configured to access the memory and execute the computer-executable instructions to:
  determine that the second shuttle is to deliver an item to a chute of the item sortation system corresponding to the first portion of the aisle;
  determine a replacement chute for the item; and
  cause the second shuttle to be redirected to the replacement chute.

8. The system of claim 5, wherein the at least one processor is further configured to access the memory and execute the computer-executable instructions to:
  determine a second portion of the aisle to designate an unrestricted zone;
  determine that a second shuttle of the item sortation machine is in the unrestricted zone;
  determine that the second shuttle has delivered a first item; and
  cause the second shuttle to avoid the restricted travel zone during a return to an induction portion of the item sortation machine.

9. The system of claim 8, wherein the at least one processor is further configured to access the memory and execute the computer-executable instructions to:
  determine that the second shuttle is ready to receive a second item at the induction portion;
  determine that the second item is designated for a chute of the item sortation system corresponding to the first portion of the aisle;
  cause the second item to be routed to a manual exception handling area; and
  determine a third item to load onto the second shuttle.

10. The system of claim 8, wherein the at least one processor is further configured to access the memory and execute the computer-executable instructions to:
  determine that a third shuttle is to transport a second item from the induction portion of the item sortation machine to a chute of the item sortation machine; and
  determine a path for the third shuttle through the aisle that avoids the restricted travel zone.

11. The system of claim 5, wherein the at least one processor is further configured to access the memory and execute the computer-executable instructions to:
  detect the human present at a second location in the first exterior portion;

determine, using the second location, a second portion of the aisle of the item sortation machine to designate a restricted travel zone;
determine the first portion of the aisle of the item sortation system is to be designated an unrestricted travel zone; and
cause the first shuttle to be unpaused.

12. The system of claim 5, wherein the at least one processor is further configured to access the memory and execute the computer-executable instructions to:
determine that the human is no longer present in the first exterior portion; and
cause the first shuttle to be unpaused.

13. The system of claim 5, wherein the at least one processor is further configured to access the memory and execute the computer-executable instructions to:
determine that the human is present within a predetermined distance of the first location prior to causing the first shuttle to be paused.

14. The system of claim 5, further comprising:
a second camera configured to image a second exterior portion of the item sortation machine.

15. A method comprising:
detecting, by a controller using a first camera configured to image an exterior portion of an item sortation machine, a human present at a first location in the exterior portion;
determining, using the first location, a first portion of an aisle of the item sortation machine to designate a restricted travel zone, wherein shuttles of the item sortation machine in the restricted travel zone are prevented from movement;
determining that a first shuttle of the item sortation machine is in the restricted travel zone; and
causing the first shuttle to be paused.

16. The method of claim 15, further comprising:
determining a second portion of the aisle to designate a reduced speed zone;
determining that a second shuttle of the item sortation machine is in the reduced speed zone; and
causing a speed of travel of the second shuttle to be reduced.

17. The method of claim 16, further comprising:
determining that the second shuttle is to deliver an item to a chute of the item sortation system corresponding to the first portion of the aisle;
determining a replacement chute for the item; and
causing the second shuttle to be redirected to the replacement chute.

18. The method of claim 15, further comprising:
determining a second portion of the aisle to designate an unrestricted zone;
determining that a second shuttle of the item sortation machine is in the unrestricted zone;
determining that the second shuttle has delivered a first item; and
causing the second shuttle to avoid the restricted travel zone during a return to an induction portion of the item sortation machine.

19. The method of claim 18, further comprising:
determining that the second shuttle is ready to receive a second item at the induction portion;
determining that the second item is designated for a chute of the item sortation system corresponding to the first portion of the aisle;
causing the second item to be routed to a manual exception handling area; and
determining a third item to load onto the second shuttle.

20. The method of claim 18, further comprising:
determining that a third shuttle is to transport a second item from the induction portion of the item sortation machine to a chute of the item sortation machine; and
determining a path for the third shuttle through the aisle that avoids the restricted travel zone.

* * * * *